(12) United States Patent
Groner et al.

(10) Patent No.: US 7,632,211 B2
(45) Date of Patent: Dec. 15, 2009

(54) SHIFT CONTROL METHOD FOR AN AUTOMATIC GEARBOX

(75) Inventors: Wolfgang Groner, Friedrichshafen (DE); Andelko Vesenjak, Meckenbeuren (DE); Thomas Hafen, Salem (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 374 days.

(21) Appl. No.: 11/814,301

(22) PCT Filed: Dec. 2, 2005

(86) PCT No.: PCT/EP2005/012874

§ 371 (c)(1),
(2), (4) Date: Jul. 19, 2007

(87) PCT Pub. No.: WO2006/076944

PCT Pub. Date: Jul. 27, 2006

(65) Prior Publication Data

US 2008/0113847 A1   May 15, 2008

(30) Foreign Application Priority Data

Jan. 19, 2005   (DE) .................. 10 2005 002 496

(51) Int. Cl.
*B60W 10/00* (2006.01)
*B60W 10/04* (2006.01)
*B60W 10/10* (2006.01)

(52) U.S. Cl. .................. 477/71; 477/115; 477/170

(58) Field of Classification Search .................. 477/70, 477/71, 115, 120, 170, 180
See application file for complete search history.

(56) References Cited

U.S. PATENT DOCUMENTS 5,931,758 A * 8/1999 Walter .......................... 475/72
6,012,345 A   1/2000 Wafzig et al.

(Continued)

FOREIGN PATENT DOCUMENTS

DE   197 26 567 A1   12/1998

(Continued)

*Primary Examiner*—Tisha D Lewis
(74) *Attorney, Agent, or Firm*—Davis & Bujold, P.L.L.C.

(57) ABSTRACT

A shift control method of a range group transmission with a multi-speed main transmission, which connects with a drive motor, via a clutch (K) and an input shaft. A transmission brake optionally engages the input shaft. At least a two range group is located downstream of the main transmission. A range change shift is accomplished by changing a gear of the main transmission and the range group. The shifting sequence is accelerated by: reducing motor torque and disengaging the clutch (K); disengaging a previous range group gear; synchronizing a new range group gear; disengaging a previous main transmission gear; engaging the new range group gear; synchronizing a new main transmission gear; engaging the new main transmission gear; and engaging the clutch (K) and increasing the motor torque, such that synchronization of the new gear occurs by influencing the input shaft of the main transmission.

10 Claims, 2 Drawing Sheets

U.S. PATENT DOCUMENTS

| | | |
|---|---|---|
| 6,814,196 B2 | 11/2004 | Voit |
| 7,021,170 B2 | 4/2006 | Döbele |
| 2002/0014134 A1 | 2/2002 | Ehrlinger |
| 2005/0274564 A1 | 12/2005 | Pelchen et al. |
| 2006/0211536 A1 | 9/2006 | Guggolz et al. |
| 2009/0107289 A1* | 4/2009 | Borntrager .................. 74/745 |

FOREIGN PATENT DOCUMENTS

| | | |
|---|---|---|
| DE | 197 54 726 A1 | 6/1999 |
| DE | 100 36 511 A1 | 2/2002 |
| DE | 101 52 857 A1 | 5/2003 |
| DE | 102 10 177 A1 | 9/2003 |
| DE | 102 38 127 A1 | 3/2004 |
| DE | 102 49 951 A1 | 5/2004 |
| EP | 0 512 708 A2 | 11/1992 |

* cited by examiner

SHIFT CONTROL METHOD FOR AN AUTOMATIC GEARBOX

This application is a national stage completion of PCT/EP2005/012874 filed Dec. 2, 2005, which claims priority from German Application Serial No. 10 2005 002 496.3 filed Jan. 19, 2005.

FIELD OF THE INVENTION

The invention concerns a shift control method for an automatic transmission constructed as a range group transmission, with a multi-speed main transmission which, on the input side, can be connected, via a controllable startup and shifting clutch with a drive motor, and has a transmission brake in connection with its input shaft, as well as with an at least two stage range group arranged downstream from the main transmission in terms of drive engineering, whereby a range change shift is conducted with a change of the gear ratio in the main transmission, as well as in the range group.

BACKGROUND OF THE INVENTION

Transmissions with a large range of narrow gear ratios are necessary, especially for use in commercial vehicles such as trucks or busses. In order to achieve the high number of gears with reasonable costs, as well as with as low weight and construction space requirements as possible, frequently a so-called range group transmission is used, which is formed from a multi-speed main transmission and a usually two-stage range group arranged downstream in relation to this.

The main transmission itself has, in this connection, a relatively low range from 2 to 3 and is usually constructed as a spur gear transmission in a gearbox design. The shifting clutches of the main transmission can be realized synchronized or unsynchronized, i.e., as friction ring synchronous clutches or as claw clutches. The shifting, thus changing the gear of the main transmission, can basically take place manually or automatically. Nonetheless, presently the discussion proceeds from automatic shifting of the main transmission for which the latter is provided with a transmission brake in connection with the affected input shaft, as it is known from German Patent DE 102 10 177 A1.

In contrast, the range group has a relatively large spread in the range from about 2.5 to 5. A spread of the overall transmission from 5 to 15 results from this and, in the event of four gears of the main transmission as well as two gears of the range group (an L-reduction gear for a slow gear group and an S gear for a fast gear group), a total of 8 gears result. The small or slow gears of the overall transmission are formed by the gears of the main transmission when the L gear of the range group is engaged and the large or fast gear groups by the same gears of the main transmission when the S gear of the range group is engaged.

The range group is, for example, constructed as a simple planetary gearset. The sun gear is connected with the input shaft and its planet carriers with the output shaft of the overall transmission. With a range group constructed in this manner, the L gear is shifted by arresting the ring gear on the transmission housing and the S group by a coupling of the ring gear with the planet carrier. Alternatively, the range group can, however, also be constructed as a spur gear transmission in gearbox design.

In the event of a range change shift, a change of the gear is conducted, in each case, in the main transmission, as well as in the downstream range group. In the event of a range change-up shift, a shift is made in the range group from the L gear into the S gear, while in the range transmission, there is a shift back from the greatest gear, usually constructed in the form of a direct gear, into the smallest gear. Conversely, in the event of a range change downshift in the range group, there is a shift back from the S gear into the L reduction group and, in the main transmission, there is an upshift from the smallest gear into the largest gear. In deviation from this, with a range change shift, jumping over one gear inside the main transmission is also possible. Since almost simultaneous shifting of the main transmission and the range group is difficult to bring about manually, the range groups of known range group transmissions are usually shifted automatically using synchronized shifting clutches.

The chronological course of a range change shift can be differently configured corresponding to the respective goal. Usually with a range change shift following disengagement of the startup and shifting clutch, the previous gear of the main transmission is disengaged; the new gear of the range group is synchronized and subsequently engaged; the new gear of the main transmission is synchronized and subsequently engaged and finally the startup and shifting clutch is engaged again.

With this shifting sequence, which is also known from German Patent DE 197 54 726 A1, the moments of inertia to be synchronized of the respective input shafts and the transmission elements connected with these as well as the therewith necessary shifting forces are, in each case, minimized by a delay or an acceleration. But the disadvantage is that acceleration of the shifting sequence, especially within a range group, is possible only with a considerable expenditure in equipment. Thus a synchronizing apparatus must be provided for accelerating the shifting process in the range group, such as a transmission brake, to retard and an auxiliary drive to accelerate the input shaft of the range group which, however, only comes into question for special motor vehicles due to space and cost reasons.

With another shifting sequence in accordance with German Patents DE 100 36 511 A1 and DE 101 52 857 A1, it is provided that in each case prior to shifting the main transmission, the previous gear of the range group is disengaged and, after shifting the main transmission, the new gear of the range group is synchronized and engaged. In this way, the synchronization of the main transmission can, indeed, take place with the startup and shifting clutch engaged by a corresponding actuation of the drive motor. The synchronization of the downstream range group is, nonetheless in this way, disadvantageously made difficult and delayed due to the great rotational speed difference and the higher moments of inertia associated with the input shaft of the range group.

Against this background, the object underlying the present invention is to propose a shift control method for an automatic range group transmission of the type mentioned at the beginning with which a range change shift can be conducted more rapidly than previously possible without great expenditure in apparatus.

SUMMARY OF THE INVENTION

The invention is based on the knowledge that in the case of a range group transmission, which is formed by an automatic main transmission and a downstream, likewise, automatic range group, outside force-controlled equipment, which is provided to synchronize the main transmission, can advantageously be used for synchronizing the downstream range group when the main transmission is engaged, thus when a gear of the main transmission is engaged.

Accordingly, it is provided in accordance with the invention for the acceleration of the shifting sequence that the shifting steps of the range change shift are conducted in the sequence:

Reduction of the motor torque and opening the startup and shifting clutch,
Disengaging the previous gear of the range group,
Synchronizing the new gear of the range group,
Disengaging the previous gear of the main transmission,
Engaging the new gear of the range group,
Synchronizing the new gear of the main transmission,
Engaging the new gear of the main transmission and
Closing the startup and shifting clutch as well as increasing the motor torque, whereby the synchronization of the new gear takes place in each case by an outside force-controlled action upon the input shaft of the main transmission.

In this way, it is advantageously guaranteed that without any additional component, the range group is automatically synchronized or the synchronization of the range group is supported and consequently accelerated, due to which the entire shifting sequence is quickened. The method of the invention can moreover be used, when a synchronized shifting clutch is used in the range group, to reduce the size of the shifting clutch to a smaller gauge and therewith to configure it more compactly and more cheaply. As an alternative to this, the method of the invention also enables the use of an unsynchronized shifting clutch in the range group.

Correspondingly, it is provided in the event of a range change-upshift that the synchronization of the new gear of the range group takes place through a delay of the input shaft of the main transmission by at least partially engaging the transmission brake, which is usually used for synchronizing the new gear of the main transmission in connection with an upshift within the main transmission.

When using a synchronized shifting clutch in the range group, at first, a rough synchronization takes place, using the transmission brake, in connection with upshifting of the range group inside the range change-upshift, by slowing the input shaft of the range group to about the synchronous rotational speed and, subsequently, a fine synchronization takes place using the synchronizing device of the shifting clutch of the range group. In this way, the shifting process is basically accelerated. On the other hand, the synchronization device of the shifting clutch can, as already mentioned, also be a finer gauge under these use conditions.

When using an unsynchronized shifting clutch in the range group, the entire synchronization can, in contrast, take place by retardation of the input shaft until the synchronous rotational speed is reached or a small rotational speed differential, which can be bridged over by the shifting clutch, using the transmission brake of the main transmission.

After synchronizing the new gear of the range group, the transmission brake is completely disengaged to attain a resistance-free disengagement of the previous gear of the main transmission and a resistance-free engagement of the new gear of the range group appropriately prior to disengaging the previous gear of the main transmission.

With a range change-upshift, a subsequent synchronization of the new gear of the main transmission then takes place in an inherently familiar manner, through acceleration of the input shaft of the main transmission by at least partially engaging the startup and shifting clutch.

In a similar manner, it is provided in connection with a range change-downshift that the synchronization of the new gear of the range group takes place through acceleration of the input shaft of the main transmission using the drive motor by at least partially engaging of the startup and shifting clutch, which also can be used for synchronizing the new gear of the main transmission in connection with a downshift within the main transmission.

When using a synchronized shifting clutch in the range group, first a rough synchronization can occur by accelerating the input shaft of the range group to about the synchronous rotational speed, using the startup and shifting clutch and, subsequently, for overcoming the remaining rotational differential speed, fine synchronization can occur, using the synchronization device of the shifting clutch of the range group.

When using an unsynchronized shifting clutch in the range group, the entire synchronization, in contrast, is appropriately conducted, using the startup and shifting clutch, by accelerating the input shaft of the range group until the synchronous rotational speed or a small rotational speed difference, which can be overcome by the shifting clutch, is reached.

After synchronization of the new gear of the range group, the startup and shifting clutch is completely disengaged to attain a resistance-free disengagement of the previous gear and a resistance-free engagement of the new gear of the range group appropriately before disengaging the previous gear of the main transmission.

With the range change-downshift, the subsequent synchronization of the new gear of the main transmission occurs in a familiar manner, through retarding the input shaft of the main transmission by at least partially engaging the transmission brake provided for this.

BRIEF DESCRIPTION OF THE DRAWINGS

The invention will now be described, by way of example, with reference to the accompanying drawings in which.

DETAILED DESCRIPTION OF THE INVENTION

Figure 1:
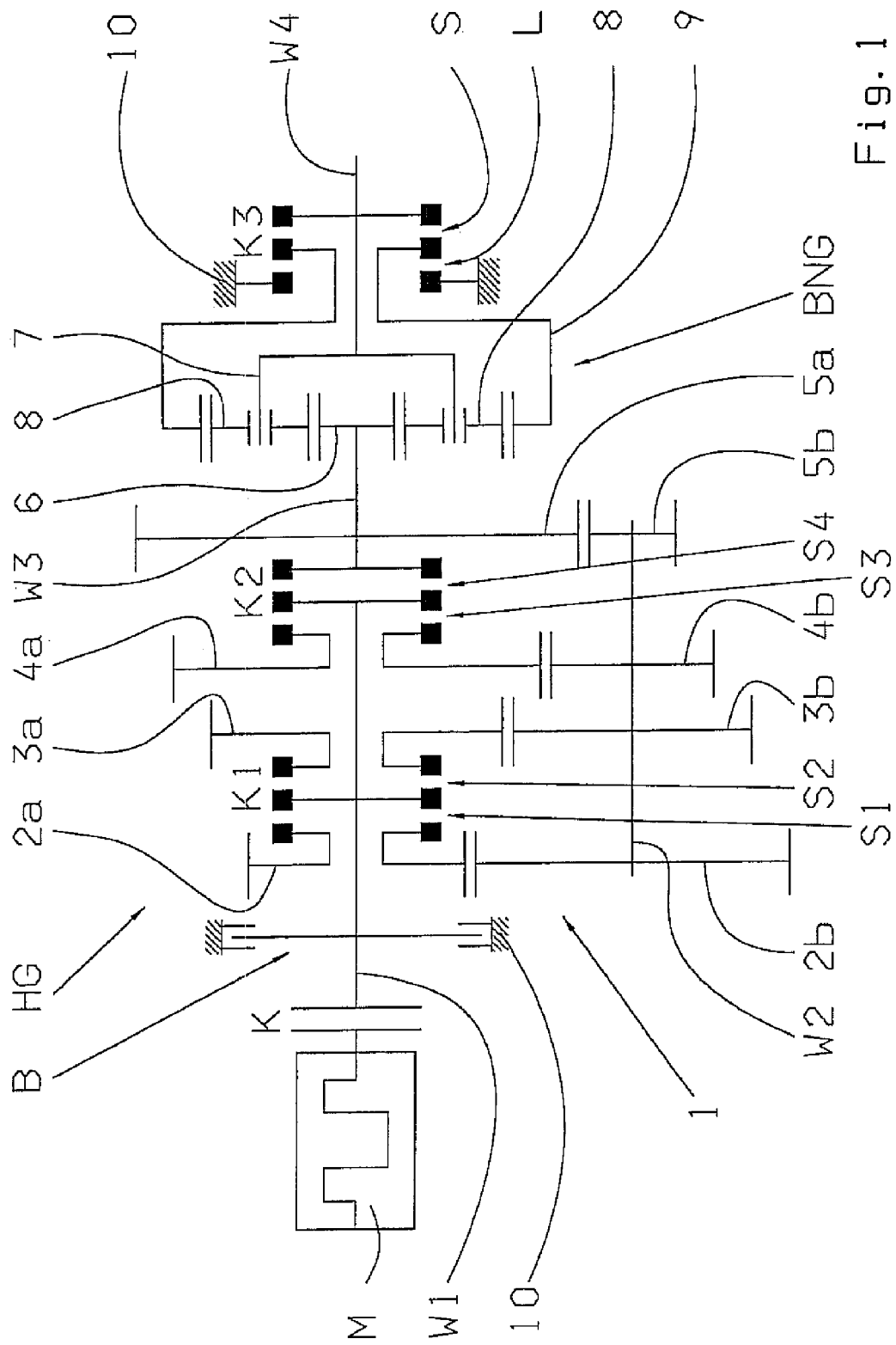
FIG. 1 illustrates the schematic construction of a range group transmission which can be operated in accordance with the method.

An automatic transmission in accordance with FIG. 1 is constructed as a range group transmission 1 with a main transmission HG and a range group BNG downstream from this. The main transmission HG is in connected with its input shaft W1, via a controllable startup and shifting clutch K, to a drive motor M, constructed as an internal combustion motor. Furthermore, the main transmission HG has a transmission brake B on the input shaft W1.

The main transmission HG is presently constructed as a four-stage spur gear transmission in gearbox design and has, beside the input shaft W1, a countershaft W2, an output shaft W3 and two shifting clutches K1, K2 arranged on the input shaft. Three pairs of gears 2a, 2b; 3a, 3b; 4a, 4b are respectively arranged with a loose gear 2a, 3a, 4a on the input shaft W1 and, in each case, with a fixed gear 2b, 3b, 4b on the countershaft W2. Of these the first gear pair 2a, 2b has a large gear ratio >1; the second gear pair 3a, 3b has a medium gear ratio >1, and the third gear pair 4a, 4b has a low gear ratio >1. A fourth gear pair 5a, 5b consists of a fixed gear 5b connected with a countershaft W2, as well as a fixed gear 5b, connected with output shaft W3 and has a gear ratio >1 between the countershaft W2 and the output shaft W3.

The shifting clutches K1, K2 respectively have two shifting positions, besides a neutral position in which in each case none of the adjacent gear gears is connected with the input shaft W1. In shifting position S1 of the first shifting clutch K1, the loose gear 2a of the first gear pair 2a, 2b is coupled in a rotationally fixed manner with the input shaft W1 and the first gear S1 of the main transmission HG is engaged. The flow of force takes place, in this case, from the input shaft W1 through the first gear pair 2a, 2b, the countershaft W2 and the fourth gear pair 5a, 5b into the output shaft W3.

In the shifting position S2 of the first shifting clutch K1, the loose gear 3a of the second gear pair 3a, 3b is connected in a rotationally fixed manner with the input shaft W1 such that when the second gear S2 of the main transmission HG is engaged and the flow of force takes place through the second gear pair 3a, 3b.

In the same manner, the third gear S3 of the main transmission HG is engaged in the shifting position S3 of the second shifting clutch K2 and the flow of force takes place from the input shaft W1 through the third gear pair 4a, 4b, the countershaft W2 and the fourth gear pair 5a, 5b into the output shaft W3.

In shifting position S4 of the second shifting clutch K2, the input shaft W1 is, in contrast, directly coupled with the output shaft W3, due to which the fourth gear S4 of the main transmission HG is formed with the gear ratio i=1.

Through transmission brake B, the input shaft W1 of the main transmission HG can be braked in relation to the transmission housing 10, which is used in connection with automatic upshifts within the main transmission HG for synchronization or for assisting synchronization of the affected shifting clutches K1, K2.

The downstream range group BNG is presently constructed as a simple planetary gear gearset with a sun gear 6, a planet carrier 7, bearing several planetary gears 8 and a ring gear 9. The sun gear 6 is connected in a rotationally fixed manner with the input shaft W3 of the range group BNG, which is rigidly coupled with the output shaft W3 of the main transmission HG and is, therefore, designated identically with this, in FIG. 1. The planet carrier 7 is connected in a rotationally fixed manner with an output shaft W4 of range group BNG. The ring gear 9 is connected in a rotationally fixed manner with the movable part of a third shifting clutch K3, which besides a neutral position, in which no connection of the ring gear 9 with another component exists, has a shifting position L (for slow group) and an S (for rapid group).

In shifting position L of shifting clutch K3, the ring gear 9 is arrested rotationally braked in relation to the transmission housing 10. In this way, the planetary gear 8, driven by the sun gear 6, are driven by the internal gearing of the stationary ring gear 9. Accordingly, the planet carrier 7 and the output shaft W4, connected with this, rotate in the ratio of approximately 1 to 2.5 to 1 to 5 times slower than the input shaft W3. The effective transmission ratio between the input shaft W3 and the output shaft W4 consequently lies in the range of i=2.5 to i=5 and will subsequently be assumed as i=3.5.

In shifting position S of shifting clutch K3, the ring gear 9 is, in contrast, coupled in a rotationally fixed manner with the output shaft W4 and the planet carrier 7 standing in connection with this, so that the planetary gears 8 are locked in relation to the ring gear 9 and the entire planetary gearset circulates rigidly with the rotational speed of the sun gear 6. The effective transmission ratio between the input shaft W3 and the output shaft W4 is then i=1.

Figure 2:
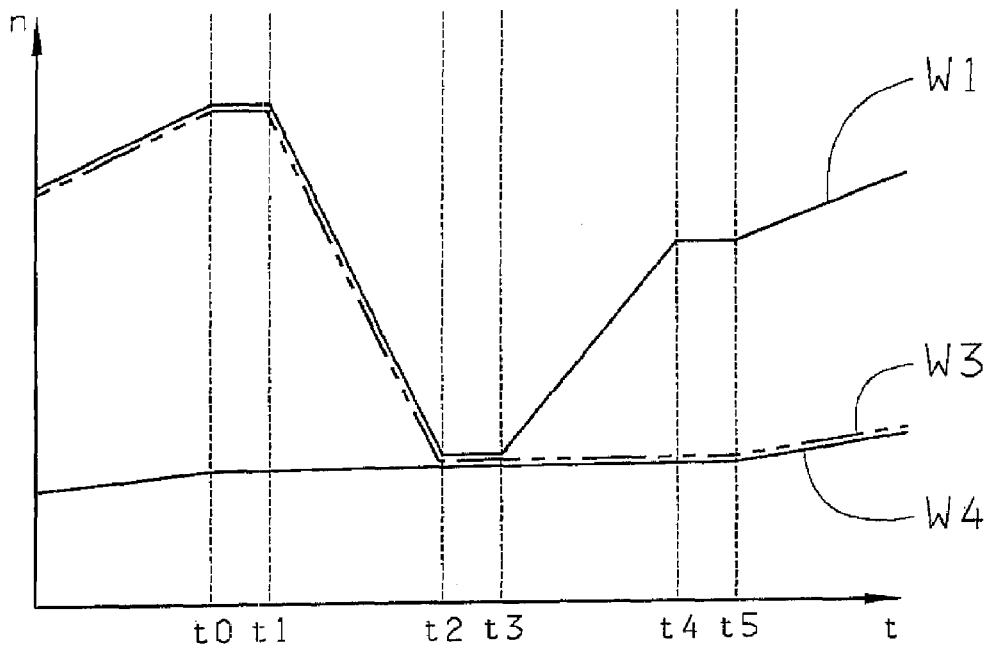
FIG. 2 illustrates the rotational speed over time of a range change-upshift of the invention.
Figure 3:
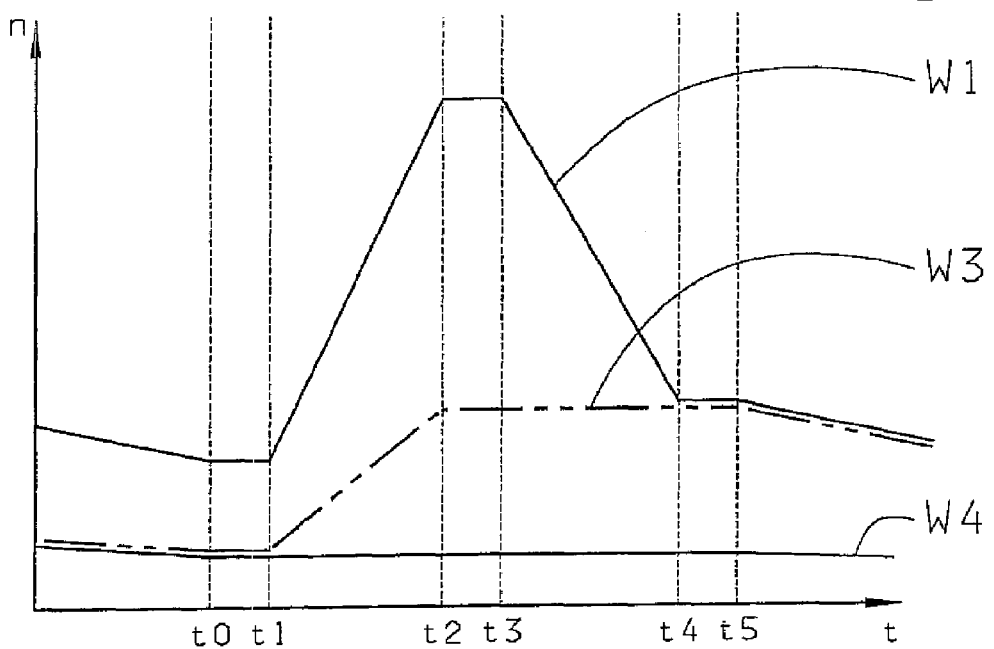
FIG. 3 illustrates the rotational speed overtime of a range change-downshift of the invention.

Subsequently according to the invention, the sequence of a range change-upshift will be explained in greater detail based upon the range group transmission according to FIG. 1 on the basis of the diagram of FIG. 2, and the sequence of a range change downshift on the basis of the diagram according to FIG. 3.

A range change-upshift includes an upshift within the range group BNG, presently from the gear L into the gear S, and a downshift within the main transmission HG, presently from the fourth gear S4 into a first gear S1. In FIG. 2, the curves of the rotational speeds n of the transmission shafts W1, W3 and W4 over time t are represented now for the period of time of this shifting process. The initial position of the shifting process is an acceleration phase of the affected motor vehicle. Consequently, the rotational speeds n of the transmission shafts W1, W3 and W4 rise. In this connection, the input shaft W1 of the main transmission HG and the input shaft W3 of the range group BNG rotate equally fast, since the old gear S4, engaged in the main transmission HG, is the direct gear with the transmission ratio of i=1.

Both transmission shafts W1 and W3 rotate by the factor 3.5 times faster than the output shaft W4 of the range group BNG, since in the latter the gear L is engaged with the assumed transmission ratio i=3.5. Since the rotational speed of the input shaft W1, which is identical with the motor rotational speed of a drive motor M, due to the engaged startup and shifting clutch K, reaches a specified upper limiting value, upshifting is necessary.

The range change-upshifting begins at point in time t0 with the disengagement of the startup and shifting clutch K and the simultaneous reduction of the motor torque of the drive motor M. Directly following, the old gear L of the range group BNG is disengaged by shifting the third shifting clutch K3 into the neutral position at point in time t1. Between times t1 and t2, a new gear S of the range group BNG is synchronized by braking the input shaft W1 of the main transmission HG by at least partially engaging of the transmission brake B. Upon reaching the synchronous rotational speed or a specified small rotational speed difference of the third shifting clutch K3, the old gear S4 of the main transmission HG is disengaged at point in time t2 by shifting the second shifting clutch K2 into the neutral position.

Subsequently at point in time t3, the new gear S of the range group BNG is engaged, resistance-free, through shifting the third shifting clutch K3 into shift position S. Between the points in time t2 and t3, the transmission brake B is once again completely disengaged. Subsequently between the points in time t3 and t4, synchronization of the new gear S1 of the main transmission HG takes place by way of drive motor M, by at least partially engaging of the startup and shifting clutch K. Upon reaching the synchronous rotational speed or a specified small rotational speed difference of the first shifting clutch K1, the new gear S1 of the main transmission HG is engaged at time t4, through shifting the first shifting clutch K1 into the shifting position S1. Subsequently at point in time t5, the startup and shifting clutch K is completely engaged due to which the shifting process is ended.

From the point in time t3 onward, the rotational speeds of the input shaft W3 and the output shaft W4 of the range group are identical since both transmission shafts W3, W4 are essentially directly connected with each other through the third shifting position S of the third shifting clutch K3. From time t4 onward, there exists, between the input shaft W1 of the main transmission HG and transmission shafts W3, W4, a rotational speed ratio corresponding to the transmission ratio of the first gear S1 of the main transmission which presently, by way of example, is assumed to be i=2.5. It also becomes apparent from the rotational speed curve of the input shaft W1 of the main transmission HG that this is, at first braked between points in time t1 and t2 together with the input shaft W3 of the range group BNG, in order thereafter to be accelerated, alone, again between the points in time t3 and t4. This disadvantage is, however, more than compensated in that no single additional component is required for the synchronization of the range group BNG and the entire shifting process is significantly accelerated by the method of the invention.

A range change-downshift, in contrast, includes downshifting inside the range group BNG, presently from gear S into gear L, as well as upshifting within the main transmission HG, presently from the first gear S1 into the fourth gear S4. In FIG. 3, analogously to FIG. 2, the curves of the rotational speeds n of the transmission shafts W1, W3 and W4 for the points in time of this shifting process are represented through time t. The initial position of the shifting process is a delay phase of the affected motor vehicle. Consequently, the rotational speeds of the transmission shafts W1, W3, W4 drop. In this connection, the input shaft W3 and the output shaft W4 of the range group BNG rotate equally fast since the gear S, previously engaged in the range group, is the direct gear with the transmission ratio i=1. The input shaft W1 of the main transmission HG rotates by the factor 2.5 times faster than the transmission shafts W3 and W4, since in the main transmission HG, the first gear S1 is engaged with the transmission ratio i=2.5. Since the rotational speed of the input shaft W1, which is equal to the motor rotational speed of the drive motor M, due to the engaged startup and shifting clutch K, reaches a specified lower limiting value, a downshift must take place.

The range change-downshift begins at the point in time t0 with the disengagement of the startup and shifting clutch K and the simultaneous reduction of the motor torque of the drive motor M. Directly thereafter, the previous gear S of the range group BNG is disengaged by shifting the third shifting clutch K3 into the neutral position at the point in time t1. Between the points in time t1 and t2, the new gear L of range group BNG is synchronized by accelerating the input shaft W1 of the main transmission HG by way of the drive motor M by at least partially engaging the startup and shifting clutch K. Upon reaching the synchronous rotational speed or a specified small rotational speed difference of the third shifting clutch K3, at time t2, the previous gear S1 of the main transmission HG is disengaged by shifting the first shifting clutch K2 into the neutral position. Subsequently at time t3, the new gear L of the range group BNG is engaged resistance-free by a shifting the third shifting clutch K3 into the shifting position L. The startup and shifting clutch K is completely disengaged again between times t2 and t3.

Subsequently, between the points in time t3 and t4, synchronization of the new gear S4 of main transmission HG takes place, by at least partially engaging the transmission brake B. Upon reaching the synchronous rotational speed or a specified small rotational speed differential of the second shifting clutch K2, the new gear S4 of the main transmission HG is engaged at the point in time t4 by shifting the second shifting clutch K2 into the shifting position S4. Between the points in time t4 and t5, the transmission brake B is completely disengaged before the startup and shifting clutch K is engaged again at the point in time t5, at which time the shifting process is ended.

From the point in time t4 onward, the rotational speeds of the input shaft W1 of the main transmission HG and the input shaft W3 of the range group BNG are identical, since both transmission shafts are directly connected with each other through the shifting position S4 of the second shifting clutch K2. Beginning with the point in time t4, a rotational speed ratio, corresponding to the transmission ratio of gear S of the range group BNG of presently i=3.5, moreover, exists between the transmission shafts W1, W3 and the output shaft W4 of the range group BNG.

From the rotational speed curve of the input shaft W1 of the main transmission HG, it once again becomes apparent that this is first accelerated between the points in time t1 and t2, together with the input shaft W3 of the range group BNG, subsequently, in order to be braked alone again at the points in times t3 and t4. This disadvantage is, however, relatively insignificant and is taken into consideration, since the shifting process is overall significantly accelerated by the outside force-controlled synchronization and no single additional component is needed for this.

REFERENCE NUMERALS 1 range group transmission
2a loose gear (of the first gear pair)
2b fixed gear (of the first gear pair)
3a loose gear (of the second gear pair)
3b fixed gear (of the second gear pair)
4a loose gear (of the third gear pair)
4b fixed gear (of the third gear pair)
5a loose gear (of the fourth gear pair)
5b fixed gear (of the fourth gear pair)
6 sun gear
7 planet carrier
8 planetary gear
9 ring gear
10 transmission housing
B transmission brake
BNG (downstream) range group
HG main transmission
K startup and shifting clutch
K1 first shifting clutch (of the HG)
K2 second shifting clutch (of the HG)
K3 third shifting clutch (of the BNG)
L shifting position (of K3), gear (of the BNG)
M drive motor
n rotational speed
S shifting position (of K3), gear (of the BNG)
S1 shifting position (of K1), first gear (of the HG)
S2 shifting position (of K1), second gear (of the HG)
S3 shifting position (of K2), third gear (of the HG)
S4 shifting position (of K2), fourth gear (of the HG)
t time
t0 point in time (of the shifting sequence)
t1 point in time (of the shifting sequence)
t2 point in time (of the shifting sequence)
t3 point in time (of the shifting sequence)
t4 point in time (of the shifting sequence)
t5 point in time (of the shifting sequence)
W1 input shaft (of the HG)
W2 countershaft (of the HG)
W3 output shaft (of the HG), input shaft (of the BNG)
W4 output shaft (of the BNG)

The invention claimed is:

1. A shift control method of an automatic transmission, the automatic transmission (1) including at least a two stage range group (BNG) and a multistage main transmission (HG), the automatic transmission (1) having an input shaft (W1) connectable, via a controllable start up and shifting clutch (K), with a drive motor (M) and being braked by a transmission brake (B), the at least two stage range group (BNG) being located downstream of the main transmission (HG) such that a range change shift is rapidly accomplished by a gear change in the main transmission (HG) and a gear change in the at least two stage range group (BNG) by synchronization of a subsequent gear in each of the main transmission and the at least two stage range group by an outside force-controlled action on the input shaft (W1) of the main transmission (HG), the method comprising the steps of:
- reducing a motor torque and disengaging the start up and shifting clutch (K);
- disengaging an engaged gear of the at least two stage range group (BNG);
- synchronizing the subsequent gear of the at least two stage range group (BNG);
- disengaging an engaged gear of the main transmission (HG);
- engaging the subsequent gear of the at least two stage range group (BNG);
- synchronizing the subsequent gear of the main transmission (HG);
- engaging the subsequent gear of the main transmission (HG); and
- engaging the start up and shifting clutch (K) and increasing the motor torque.

2. The method according to claim 1, further comprising the step of retarding the input shaft (W1) of the main transmission (HG), by at least partially engaging the transmission brake (B), to synchronize the subsequent gear (S) of the at least two stage range group (BNG) and accomplish a range change-upshift.

3. The method according to claim 2, further comprising the step of approximately synchronizing, by retarding rotation of an input shaft (W3) of the at least two stage range group (BNG) via the transmission brake (B) of the main transmission (HG), to approximate a synchronous rotational speed, and thereafter finely synchronizing, via a synchronizing device of a shifting clutch (K3) of the at least two stage range group (BNG), when using a synchronized shifting clutch (K3) of the at least two stage range group (BNG).

4. The method according to claim 2, further comprising the step of, when using an unsynchronized shifting clutch (K3) in the at least two stage range group (BNG), retarding an input shaft (W3) of the at least two stage range group (BNG) via the transmission brake (B) of the main transmission (HG) until attaining one of a synchronous rotational speed and a small rotational speed difference, which is bridgeable by the shifting clutch (K3), to achieve overall synchronization.

5. The method according to one of claim 2, further comprising the step of completely disengaging the transmission brake (B) before disengaging the engaged gear (S4) of the main transmission (HG).

6. The method according to claim 1, further comprising the step of, when attempting a change-down shift, synchronizing the subsequent gear (L) of the at least two stage range group (BNG) by accelerating the input shaft (W1) of the main transmission (HG) with the drive motor (M) and at least partially engaging the start up and shifting clutch (K).

7. The method according to claim 6, further comprising the step of, when using a synchronized shifting clutch (K3) of the at least two stage range group (BNG), approximately synchronizing, by accelerating rotation of an input shaft (W3) of the at least two stage range group (BNG) via the start up and shifting clutch (K), to approximate a synchronous rotational speed, and thereafter finely synchronizing a shifting clutch (K3) of the at least two stage range group (BNG).

8. The method according to claim 6, further comprising the step of when using an unsynchronized shifting clutch (K3) in the at least two stage range group (BNG), accelerating an input shaft (W3) of the at least two stage range group (BNG) until attaining one of a synchronous rotational speed and a small rotational speed difference, which is bridgeable by the shifting clutch (K3), to achieve overall synchronization.

9. The method according to claim 6, further comprising the step completely disengaging the start up and shifting clutch (K) prior to disengaging the engaged gear (S1) of the main transmission (HG).

10. A method of controlling range change shifting of an automatic transmission having a multistage main transmission (HG) and an at least two gear range group (BNG), the automatic transmission includes an input shaft (W1) connected to a transmission brake (B) and, via a first clutch (K), to a drive motor, the range group (BNG) being located, in a flow of power direction, downstream of the main transmission (HG), the method comprising the steps of:
- reducing torque from the drive motor and disengaging the start up and shifting clutch (K);
- disengaging an engaged gear of the range group (BNG);
- synchronizing a subsequent gear of the range group (BNG), by one of reducing rotation of the input shaft (W1) by at least partial engagement of the transmission brake (B) and accelerating the input shaft (W1) with the drive motor (M) by at least partial engagement of the start up and shifting clutch (K);
- disengaging the engaged gear of the main transmission (HG);
- engaging the subsequent gear of the range group (BNG);
- disengaging one of the transmission brake (B) and the start up and shifting clutch (K);
- synchronizing the subsequent gear of the main transmission (HG), by at least partially engaging one of the start up and shifting clutch (K) and the transmission brake (B);
- engaging the subsequent gear of the main transmission (HG);
- disengaging the transmission brake (B), if at least partially engaged; and
- engaging the start up and shifting clutch (K) and increasing the motor torque from the drive motor.

* * * * *